United States Patent [19]

Nakama et al.

[11] Patent Number: 4,704,059
[45] Date of Patent: Nov. 3, 1987

[54] SCREW GROMMET

[75] Inventors: Daiji Nakama, Toyota; Masaru Arakawa, Chigasaki, both of Japan

[73] Assignee: Nifco Inc., Yokohama, Japan

[21] Appl. No.: 885,385

[22] Filed: Jul. 16, 1986

Related U.S. Application Data

[63] Continuation of Ser. No. 746,823, Jun. 20, 1985, abandoned.

[30] Foreign Application Priority Data

Jul. 2, 1984 [JP] Japan .................. 59-135193

[51] Int. Cl.⁴ .............................................. F16B 37/04
[52] U.S. Cl. .................................. 411/182; 411/510; 411/913
[58] Field of Search ............... 411/182, 508, 509, 510, 411/913, 907, 908; 24/297

[56] References Cited

U.S. PATENT DOCUMENTS

| | | | |
|---|---|---|---|
| 2,946,612 | 7/1960 | Ahlgren | 411/510 X |
| 3,375,749 | 4/1968 | Coldren et al. | 411/913 X |
| 3,449,799 | 6/1969 | Bien | 411/908 X |
| 3,508,593 | 4/1970 | Gill | 411/182 |
| 4,077,300 | 3/1978 | Yoda | 411/913 X |
| 4,133,246 | 1/1979 | Small | 411/913 X |
| 4,460,298 | 7/1984 | Solarz et al. | 411/182 X |
| 4,579,492 | 4/1986 | Kazino et al. | 411/182 X |

FOREIGN PATENT DOCUMENTS

| | | | |
|---|---|---|---|
| 707819 | 4/1954 | United Kingdom | 411/182 |
| 745788 | 2/1956 | United Kingdom | 411/508 |
| 1020694 | 2/1966 | United Kingdom | 411/510 |

Primary Examiner—Gary L. Smith
Assistant Examiner—Neill Wilson
Attorney, Agent, or Firm—Trexler, Bushnell, Giangiorgi & Blackstone, Ltd.

[57] ABSTRACT

A plastic screw grommet is disclosed, which has a body formed with a threaded hole and also formed in a lower end portion with a diagonal slit. A side of at least one of divisions defined by the slit is formed with a flexible hook portion adjacent to an edge of the slit and outwardly inclined toward the flange.

4 Claims, 14 Drawing Figures

SCREW GROMMET

This application continuation, of application Ser. No. 746,823, filed June 20, 1985 now abandoned.

BACKGROUND OF THE INVENTION

1. Field of the Invention

This invention relates to a screw grommet made of a plastic material, which is inserted through a polygonal hole formed in a panel and receives a screw for mounting a part on the panel.

2. Prior Art

A grommet, which comprises a body having a polygonal sectional profile complementary to a polygonal hole, through which it is to be inserted, and a flange integrally extending outwardly from the top of the body, and which is formed with a threaded hole passing through the center of the body and flange, the body having a diagonal slit formed in a lower end portion and crossing the threaded hole, is well known in the art.

In order for this screw grommet to be temporarily set in the panel when it is inserted through a square hole formed in the panel, the grommet has a pair of hook portions outwardly projecting from the edges between mating sides of the two divisions of the body defined by the slit. Therefore, when inserting the body through the square hole in the panel, the two divisions have to be brought closer by reducing the slit gap to let the hook portions pass through the square hole, so that the insertion requires a great force.

An object of the invention is to provide a plastic screw grommet, in which temporary setting means and regular setting means with respect to a panel are provided independently, which can readily be temporarily set in the panel, and the part retaining force of which is not reduced at the time of its regular setting.

SUMMARY OF THE INVENTION

In the screw grommet according to the invention, the body has a diagonal slit formed in its lower end portion such that the slit crosses a hole passing through its center, and a side of at least one of the divisions of the body defined by the slit is formed with a flexible hook portion formed adjacent to an edge of the slit and outwardly inclined toward the flange.

When inserting the body of the screw grommet having the above structure through a polygonal hole formed in a panel, the flexible hook portion is inwardly flexed by the corresponding edge of the hole as it passes through the hole. Thus, there is no need of bringing closer the divisions of the body, and the insertion does not require a great force. When the hook portion clears the polygonal hole, its initial outwardly inclined state is recovered, so that it is hooked on the edge of the hole from the back side to prevent detachment of the screw grommet. In this way, the screw grommet is set temporarily.

In addition, as the screw is screwed through the threaded hole penetrating the body with a hole of a part to be secured aligned with the threaded hole, the divisions of the body are spread, so that the part can be secured to the panel.

BRIEF DESCRIPTION OF THE DRAWINGS

The other and further objects and characteristics of this invention will become apparent from the further disclosure of the invention to be given hereinbelow with reference to the accompanying drawing.

DESCRIPTION OF THE PREFERRED EMBODIMENTS

Figure 1:
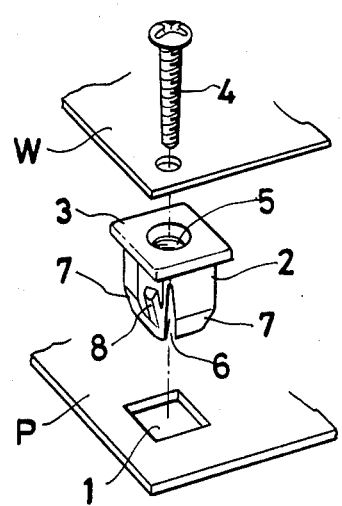
FIG. 1 is a perspective view showing a first embodiment of the screw grommet according to the invention.
Figure 2:
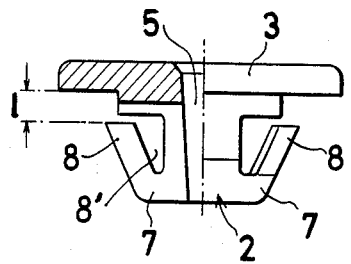
FIG. 2 is an elevational view, partly in section, showing the screw grommet shown in FIG. 1.
Figure 3:
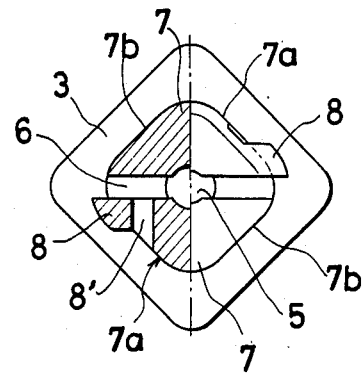
FIG. 3 is a bottom view, partly in section, showing the screw grommet shown in FIG. 1.

FIGS. 1 through 6 illustrate a first embodiment of the screw grommet according to the invention. Designated by P is a panel, in which the screw grommet is to be mounted, and which has a polygonal hole (a square hole 1 in this embodiment).

The screw grommet is a plastic one-piece molding having a body 2 of a square sectional profile complementary to the square hole 1 and a flange 3 outwardly extending from the top of the body 2. The screw grommet is inserted in the square hole 1, and a part W is secured by a screw 4 to the top surface of the flange 3. Accordingly, the screw grommet has a hole 5 passing through the centers of the body 2 and the flange 3, and having a diameter corresponding to the screw 4. As the screw is screwed in the hole 5, the body 2 is spread by the screw. Accordingly, a lower end portion of the body is formed with a diagonal slit 6 crossing the hole 5. The slit divides the lower end portion of the body into two substantially triangular divisions 7.

The two divisions 7 each have two sides 7a and 7b. The opposed sides 7a are provided with respective flexible hook portions 8 formed adjacent to the respective edges of the slit 6 and outwardly inclined toward the flange 3.

The flexible hook portions 8 are desirably formed by forming notches 8' in the respective divisions so that they can inwardly flex into the space of the notch with their top ends free. The body inwardly of each hook portion is relieved, but imperforate as may be seen, for instance, in FIG. 1. The distance l between the top of the hook portion 8 and the bottom of the flange 3 is made coincident with the thickness of the panel P.

Figure 5:
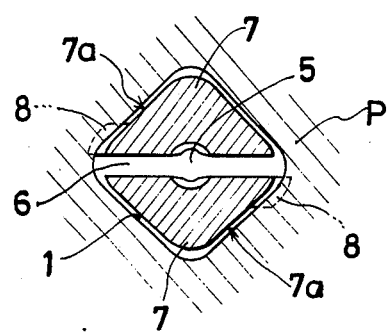
FIG. 5 is a sectional view showing the screw grommet of FIG. 1 secured to a panel.
Figure 4:
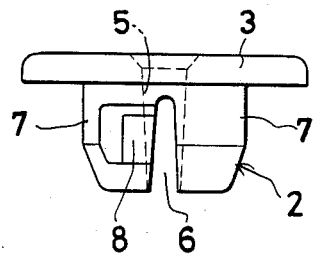
FIG. 4 is a side view showing the screw grommet shown in FIG. 1.

Thus, as the body 2 is inserted into the square hole 1 of the panel from above, each hook portion 8 is urged by the corresponding edge of the hole 1 and is flexed inwardly as it passes through the hole 1. When it clears the lower end of the hole 1, it recovers its initial, outwardly inclined state so that it hooks on the edge of the hole from below. Thus, the screw grommet inserted through the hole 1 is temporarily set against detachment in the opposite direction (FIG. 5).

Figure 6:
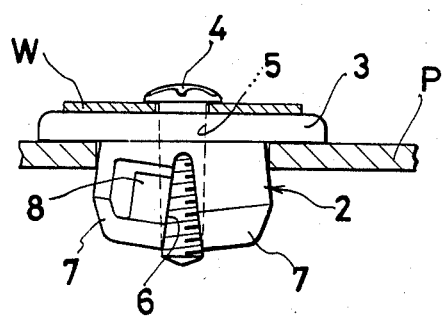
FIG. 6 is a side view showing the screw grommet of FIG. 1 secured to the panel.

Then, a part W to be secured to the flange 3 (i.e., a second panel having a hole in this embodiment) is laid on the top of the flange 3 with the hole of the part aligned with the hole 5, and the screw 4 is screwed in these holes. As the screw is screwed, the two divisions 7 are spread under the panel P. The part W is thus secured (FIG. 6).

FIGS. 7 through 10 illustrate a second embodiment of the screw grommet according to the invention. This embodiment is different from the preceding first embodiment in that the other opposed sides 7b of the two divisions are also provided with respective flexible hook portions 9 formed adjacent to the respective edges of the slit 6 and outwardly inclined toward the flange 3. The flexible hook portions 9 have a different height from that of the hook portions 8 noted above. More specifically, this screw grommet can be temporarily set in either of two panels P or P′ having different thicknesses. The distance l′ between the top of the flexible hook portions 9 and the bottom of the flange 3 is made coincident with the thickness of the panel P′.

Figure 7:
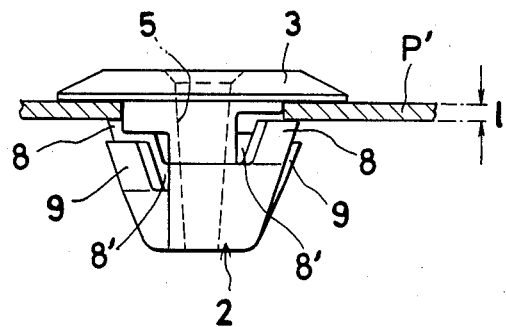
FIG. 7 is an elevational view showing a second embodiment of the screw grommet according to the invention in a state temporarily set in a panel.
Figure 8:
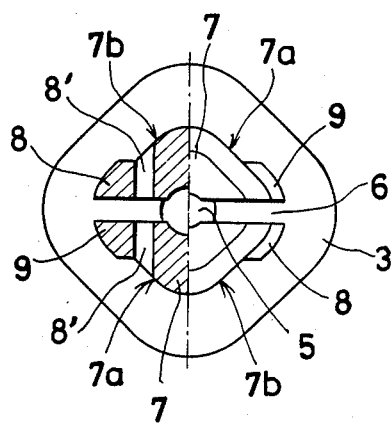
FIG. 8 is a bottom view, partly in section, showing the screw grommet shown in FIG. 7.
Figure 9:
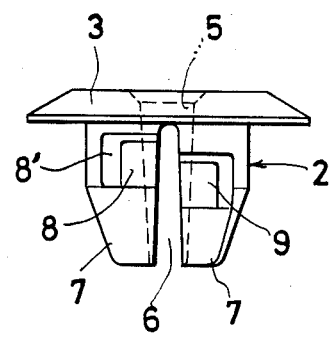
FIG. 9 is a side view showing the screw grommet shown in FIG. 7.

When the screw grommet is inserted into the panel P having the thickness l, the individual hook portions 8 and 9 pass through the hole 1 while being inwardly flexed by the edges of the hole, and they eventually clear the hole to recover their initial, outwardly inclined state. At this time, only the hook portions 8 having greater height are hooked on edges of the hole from below, whereby the screw grommet inserted through the hole 1 is temporarily set (FIG. 7).

Figure 10:
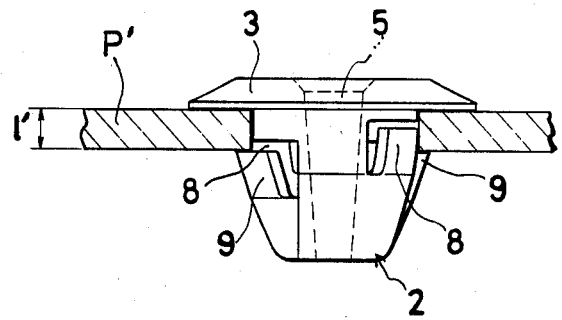
FIG. 10 is an elevational view showing the screw grommet of FIG. 7 in a state temporarily set in a thick panel.

In this state, the tops of the hook portions 9 having less height are spaced apart from the bottom of the panel P. When the screw grommet is inserted into the panel P′ having the thickness l′, the individual hook portions 8 and 9 again pass through the hole while being inwardly flexed by the edges of the hole. In this case, however, only the hook portions 9 having less height clear the hole 1 and are hooked on edges thereof from below, whereby the screw grommet inserted through the hole 1 is temporarily set (FIG. 10). In this state, the hook portions 8 having greater height, which cannot clear the hole 1, remain inwardly flexed by the hole edges.

FIGS. 11 to 14 respectively illustrate third to sixth embodiments of the screw grommet according to the invention. These embodiments are different from the preceding embodiments in that the body 2 has another diagonal slit 10 so that the lower end portion of the body is divided into four divisions 11 of substantially triangular sectional profile by the two slits 6 and 10.

Figure 11:
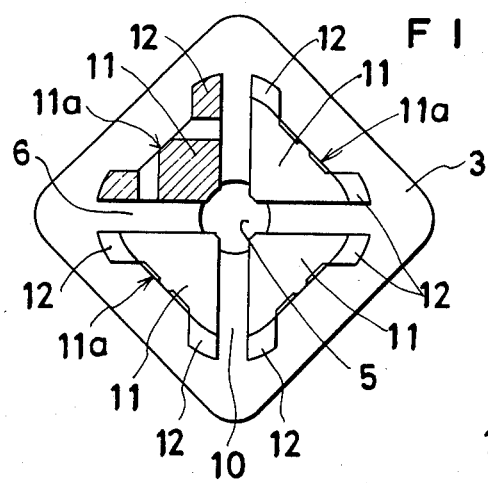
FIG. 11 is a bottom view, partly in section, showing a third embodiment of the screw grommet according to the invention.
Figure 12:
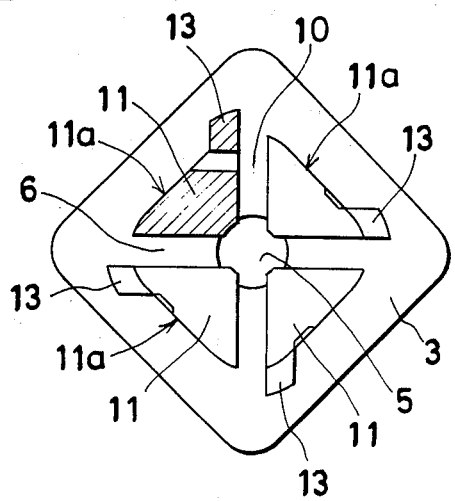
FIG. 12 is a bottom view, partly in section, showing a fourth embodiment of the screw grommet according to the invention.
Figure 13:
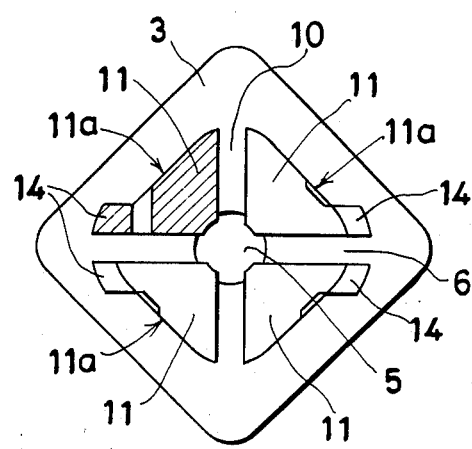
FIG. 13 is a bottom view, partly in section, showing a fifth embodiment of the screw grommet according to the invention.
Figure 14:
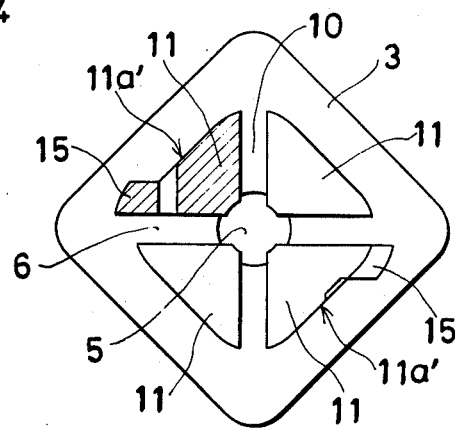
FIG. 14 is a bottom view, partly in section, showing a sixth embodiment of the screw grommet according to the invention.

In the third embodiment of FIG. 11, the four sides 11a of the body constituted by the respective divisions are each provided at the two ends with respective flexible hook portions 12 adjacent to the edges of the slits 6 and 10 and outwardly inclined toward the flange 3. In the fourth embodiment of FIG. 12, the four sides 11a of the body constituted by the respective divisions are each formed at corresponding ends with a flexible hook portion 13 adjacent to the corresponding edge of the slits 6 and 10. In the fifth embodiment of FIG. 13, the four sides of the body constituted by the respective divisions are formed with four flexible hook portions 14 adjacent to the respective edges of the slit 6. In the sixth embodiment of FIG. 14, only one pair of opposed sides of the four sides of the body are formed at corresponding ends with flexible hook portions 15 adjacent to respective edges of the slit 6.

While the body of the above embodiments of the screw grommet was described as being square in sectional profile, this is by no means limitative, and it may have any other polygonal sectional profile. Further, it is possible to form more than two diagonal slits.

With the screw grommet as described above according to the invention the regular setting means and temporary setting means with respect to the panel have independent structures, so that it is possible to provide a screw grommet which though requiring only low insertion force at the time of the temporary setting, is safe from detachment once temporarily set, and which also assures that the part retaining force will not be reduced at the time of the regular setting. That is, when the body is inserted into the polygonal hole in the panel, the flexible hook portions are flexed inwardly by the edges of the hole as the body passes through the hole, so that there is no need of bringing closer the divisions of the body, that is, the insertion does not require great force. When the hook portions clear the polygonal hole, their initial, outwardly inclined state is recovered and they hook on the edges of the hole from the back side to prevent the screw grommet in the temporarily set state from being detached or falling off under the weight of, or vibration passed through, the part.

What is claimed is:

1. A plastic screw grommet comprising a body having a polygonal sectional profile having a plurality of lateral surfaces each having a predetermined width, said body being complementary to and of smaller dimensions throughout the length of the body than a polygonal hole formed in a panel and a flange integrally extending outwardly from a top end of said body, said screw grommet being formed with an axial hole serially passing through the centers of said body and said flange, said second mentioned hole having a portion adjacent a lower end of the body smaller than a hole portion in said flange, said body having a diagonal slit formed longitudinally therein from its lower end so as to intersect said second mentioned hole and dividing said body into at least two legs each having an extending end, and a flexible hook portion integral with the at least one of said legs adjacent the entering end thereof and projecting toward said flange, said flexible hook portion being adjacent to an edge of said slit and including a free end outwardly inclined from said one division toward the bottom of said flange, said hook portion having a width substantially less than said predetermined with, said body inwardly of said hook portion being relieved but imperforate to permit flexing of said hook portion to a position substantially parallel to the axis of said hole, said free end end projecting laterally outwardly of said polygonal profile of said body for initially retaining the body within the polygonal hole in the panel when the grommet is assembled with the panel, said hook portion free end being laterally spaced from and flexible substantially independently of said body, said body being expanded upon threading of a complementary screw into said second mentioned hole for urging sides of the body outwardly for engagement beneath said panel.

2. The screw grommet according to claim 1, wherein the distane between the top of said flexible hook portion and the bottom of said flange is equal to the thickness of said panel.

3. The screw grommet according to claim 1 wherein said polygonal sectional profile is a square profile.

4. A plastic screw grommet as set forth in claim 1 wherein there are a plurality of hook portions, the free end of one hook portion being spaced from said flange differently from the free end of one other of said hook portions.

* * * * *